United States Patent Office 3,337,643
Patented Aug. 22, 1967

3,337,643
PROCESS FOR PREPARING OPTICALLY ACTIVE
MENTHOL
Daniel Lerner, Clifton, N.J., and Basilio Pispisa, Naples, Italy, assignors to Colgate-Palmolive Company, New York, N.Y., a corporation of Delaware
No Drawing. Filed Oct. 17, 1963, Ser. No. 317,029
6 Claims. (Cl. 260—631)

This invention relates to a process for preparing optically active menthol.

Menthols can be prepared by a relatively simple two-stage process. In the initial stage, limonene or dipentene is disproportionated to 3-p-menthene when contacted with certain transition metal oxide catalysts at elevated temperatures of 250° C.–350° C. In a subsequent stage, 3-p-menthene is reacted with a diborane in the presence of an ether solvent at a temperature of 0° C. to −70° C., whereupon a boron complex is formed. The complex is oxidized with hydrogen peroxide and hydrolyzed with dilute alkali to produce a mixture of racemic menthol, isomenthol and menthones.

Inasmuch as optically active menthols are more valuable than racemic menthol, isomenthol and menthones, the foregoing process falls somewhat short of the mark as a source of optically active menthols. It will be recognized, of course, that racemic menthol can be resolved into its active components, including d- and l-menthol, by techniques already available in the art. However, such a separation adds to the ultimate cost of the desired optically active compounds.

It is an object of this invention, therefore, to provide a process for preparing optically active menthols.

It is another object to provide a process wherein d-menthol or l-menthol, as desired, is formed selectively with minimal contamination with the related but unwanted optical isomer. Other objects of the invention will be apparent from the following description.

We have discovered that an optically active menthol can be formed selectively by reacting 3-p-menthene with a borane having the formula $BHR_2$ wherein R is an optically active hydrocarbon radical. The boron complex thus formed is then oxidized and hydrolyzed in accordance with the technique described above. By virtue of the modification employed herein, a menthol having an optical rotation opposite in sign (d- or l-) with that of the hydrocarbon is formed.

There are a great number of optically active hydrocarbons which can form substituted boranes, and which can be used herein. These include aliphatic, cycloaliphatic and terpenic (mono- and poly-terpenes) hydrocarbons. In general, suitable compounds will have one double bond and at least one asymmetric carbon atom. Such compounds, however, are free from groups reactive with a diborane; such undesirable groups are hydroxyl, aldehyde, carboxyl, etc. Representative of such compounds are d- and l-alpha-pinenes, and optically active camphene and bornylene; preferred herein are d-alpha-pinene and l-alpha-pinene.

This invention is illustrated, but in no sense limited by, the following example.

Example 27.2 parts (weight) of d-alpha-pinene was dissolved in 75 parts (volume) of a one molar solution of sodium borohydride in diethyleneglycoldimethyl ether (2.85 parts by weight of $NaBH_4$ in the ether). The resulting mixture was cooled to 0° C. It was then treated with 14.2 parts (weight) of boron trifluoride etherate (ethyl ether). The mixture thus formed was maintained at 0° C., and 18 parts (weight) of 3-p-menthene were added thereto. Throughout this portion of the example all reactants and reagents were carefully dried for such use and reaction was carried out in the presence of a stream of nitrogen.

The materials already mentioned were reacted at 0° C. for 3 hours. Small pieces of ice were added, followed by 31 parts (volume) of 3 molar sodium hydroxide and 30 parts (volume) of 30 percent hydrogen peroxide. As a result of the exothermic reaction which occurred, the temperature of the reaction mixture increased to about 70° C. After 20 minutes at 70° C., the reaction mixture was extracted with diethyl ether. An aqueous layer and an ether layer separated one from the other. The aqueous layer was separated and was washed with diethyl ether. The combined ether extracts were dried over anhydrous sodium sulfate, and were next heated over a water bath in order to remove solvents.

Vapor phase analysis revealed approximately 20 percent of menthols in the final product. The optical rotation of the mixture measured in a 0.5 centimeter tube was 4.7 levo rotation. Calculation of specific rotation indicated a levo rotation of 46° based on the menthols. This is in contrast to the racemic menthol formed from a diborane which has no optical activity.

It is to be understood that other optical isomers, in addition to menthols, can be formed by the process of this invention. Typical of such other optical isomers are d- or l-neothujyl alcohol from thujene, and d- or l-borneol or isoborneol.

The present invention has been described with reference to the illustrative example and conditions; however, it will be appreciated by those skilled in the art that other variations and modifications of the invention can be employed, without departing from the principle thereof. Thus, it will be understood that the invention is not limited to the particular compounds set forth in the illustrative discussion. It is intended in the appended claims to cover all such variations and modifications.

We claim:

1. The process for preparing optically active menthol which comprises reacting 3-p-menthene with a borane having the formula $BHR_2$, wherein R is an optically active hydrocarbon radical, to form a boron complex thereof, and oxidizing and hydrolyzing said boron complex to form a menthol having an optical rotation opposite that of said hydrocarbon.

2. The process defined by claim 1 wherein said 3-p-menthene and said borane are reacted at a temperature between about 0° C. and about 70° C.

3. The process for preparing d-menthol which comprises reacting 3-p-menthene with a borane having the formula $BHR_2$, wherein R is a levo-rotatory hydrocarbon radical, to form a boron complex of said 3-p-menthene, and oxidizing and hydrolyzing said complex to form d-menthol.

4. The process of claim 3 wherein the hydrocarbon radical is l-alpha-pinenyl.

5. The process for preparing l-menthol which comprises reacting 3-p-menthene with a borane having the formula $BHR_2$, wherein R is a dextro-rotatory hydrocarbon radical, to form a boron complex of said 3-p-menthene, and oxidizing and hydrolyzing said complex to form l-menthol.

6. The process of claim 5 wherein the hydrocarbon radical is d-alpha-pinenyl.

References Cited

UNITED STATES PATENTS 3,060,244  10/1962  Saegebarth _____ 260—606.5 X

OTHER REFERENCES

Wetherill: J. Org. Chem., vol 22, pp. 1136–7 (September 1957).

LEON ZITVER, *Primary Examiner.*

DANIEL D. HORWITZ, *Examiner.*

D. P. CLARKE, T. G. DILLAHUNTY,
*Assistant Examiners.*